US012270661B2

(12) United States Patent
Wang et al.

(10) Patent No.: US 12,270,661 B2
(45) Date of Patent: Apr. 8, 2025

(54) LANE MARKING LOCALIZATION AND FUSION

(71) Applicant: TUSIMPLE, INC., San Diego, CA (US)

(72) Inventors: Mingdong Wang, San Diego, CA (US); Chenzhe Qian, San Diego, CA (US); Xue Mei, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/456,015

(22) Filed: Aug. 25, 2023

(65) Prior Publication Data

US 2023/0408264 A1 Dec. 21, 2023

Related U.S. Application Data

(63) Continuation of application No. 17/320,888, filed on May 14, 2021, now Pat. No. 11,740,093, which is a (Continued)

(51) Int. Cl.
*G01C 21/30* (2006.01)
(52) U.S. Cl.
CPC .................... *G01C 21/30* (2013.01)
(58) Field of Classification Search
CPC ..... G01C 21/30; G01C 21/3658; G01S 19/14; G01S 19/49; G01S 19/485; G06V 10/809;
(Continued)

(56) References Cited

U.S. PATENT DOCUMENTS

| 6,084,870 A | 7/2000 | Wooten et al. |
| 6,243,648 B1 | 6/2001 | Kilfeather et al. |

(Continued)

FOREIGN PATENT DOCUMENTS

| CN | 102184535 A | 9/2011 |
| CN | 102815305 A | 12/2012 |

(Continued)

OTHER PUBLICATIONS

Harry Y. Oh, U.S. Appl. No. 15/896,077, Non-Final Office Action Mailed Mar. 13, 2020, pp. 1-21.

(Continued)

*Primary Examiner* — Harry Y Oh
(74) *Attorney, Agent, or Firm* — Perkins Coie LLP

(57) ABSTRACT

Various embodiments provide a system and method for iterative lane marking localization that may be utilized by autonomous or semi-autonomous vehicles traveling within the lane. In an embodiment, the system comprises a locating device adapted to determine the vehicle's geographic location; a database; a region map; a response map; a plurality of cameras; and a computer connected to the locating device, database, and cameras, wherein the computer is adapted to receive the region map, wherein the region map corresponds to a specified geographic location; generate the response map by receiving information from the camera, the information relating to the environment in which the vehicle is located; identifying lane markers observed by the camera; and plotting identified lane markers on the response map; compare the response map to the region map; and iteratively generate a predicted vehicle location based on the comparison of the response map and the region map.

13 Claims, 6 Drawing Sheets

Related U.S. Application Data continuation of application No. 16/184,926, filed on Nov. 8, 2018, now Pat. No. 11,009,356, which is a continuation-in-part of application No. 15/896,077, filed on Feb. 14, 2018, now Pat. No. 11,009,365.

(58) Field of Classification Search
CPC ... G06V 20/588; G08G 1/09626; G08G 1/167
See application file for complete search history.

(56) References Cited

U.S. PATENT DOCUMENTS

| | | | |
|---|---|---|---|
| 6,263,088 B1 | 7/2001 | Crabtree et al. | |
| 6,594,821 B1 | 7/2003 | Banning et al. | |
| 6,777,904 B1 | 8/2004 | Degner et al. | |
| 6,975,923 B2 | 12/2005 | Spriggs | |
| 7,103,460 B1 | 9/2006 | Breed | |
| 7,689,559 B2 | 3/2010 | Canright et al. | |
| 7,742,841 B2 | 6/2010 | Sakai et al. | |
| 7,783,403 B2 | 8/2010 | Breed | |
| 7,844,595 B2 | 11/2010 | Canright et al. | |
| 8,041,111 B1 | 10/2011 | Wilensky | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,175,376 B2 | 5/2012 | Marchesotti et al. | |
| 8,271,871 B2 | 9/2012 | Marchesotti | |
| 8,346,480 B2 | 1/2013 | Trepagnier et al. | |
| 8,378,851 B2 | 2/2013 | Stein et al. | |
| 8,392,117 B2 | 3/2013 | Dolgov et al. | |
| 8,401,292 B2 | 3/2013 | Park et al. | |
| 8,412,449 B2 | 4/2013 | Trepagnier et al. | |
| 8,478,072 B2 | 7/2013 | Aisaka et al. | |
| 8,553,088 B2 | 10/2013 | Stein et al. | |
| 8,706,394 B2 | 4/2014 | Trepagnier et al. | |
| 8,718,861 B1 | 5/2014 | Montemerlo et al. | |
| 8,788,134 B1 | 7/2014 | Litkouhi et al. | |
| 8,908,041 B2 | 12/2014 | Stein et al. | |
| 8,917,169 B2 | 12/2014 | Schofield et al. | |
| 8,963,913 B2 | 2/2015 | Baek | |
| 8,965,621 B1 | 2/2015 | Urmson et al. | |
| 8,981,966 B2 | 3/2015 | Stein et al. | |
| 8,983,708 B2 | 3/2015 | Choe et al. | |
| 8,993,951 B2 | 3/2015 | Schofield et al. | |
| 9,002,632 B1 | 4/2015 | Emigh | |
| 9,008,369 B2 | 4/2015 | Schofield et al. | |
| 9,025,880 B2 | 5/2015 | Perazzi et al. | |
| 9,042,648 B2 | 5/2015 | Wang et al. | |
| 9,063,548 B1 | 6/2015 | Ferguson | |
| 9,081,385 B1 | 7/2015 | Ferguson et al. | |
| 9,088,744 B2 | 7/2015 | Grauer et al. | |
| 9,111,444 B2 | 8/2015 | Kaganovich | |
| 9,117,133 B2 | 8/2015 | Barnes et al. | |
| 9,118,816 B2 | 8/2015 | Stein et al. | |
| 9,120,485 B1 | 9/2015 | Dolgov | |
| 9,122,954 B2 | 9/2015 | Srebnik et al. | |
| 9,134,402 B2 | 9/2015 | Sebastian et al. | |
| 9,145,116 B2 | 9/2015 | Clarke et al. | |
| 9,147,255 B1 | 9/2015 | Zhang et al. | |
| 9,156,473 B2 | 10/2015 | Clarke et al. | |
| 9,176,006 B2 | 11/2015 | Stein | |
| 9,179,072 B2 | 11/2015 | Stein et al. | |
| 9,183,447 B1 | 11/2015 | Gdalyahu et al. | |
| 9,185,360 B2 | 11/2015 | Stein et al. | |
| 9,191,634 B2 | 11/2015 | Schofield et al. | |
| 9,214,084 B2 | 12/2015 | Grauer et al. | |
| 9,219,873 B2 | 12/2015 | Grauer et al. | |
| 9,233,659 B2 | 1/2016 | Rosenbaum et al. | |
| 9,233,688 B2 | 1/2016 | Clarke et al. | |
| 9,248,832 B2 | 2/2016 | Huberman | |
| 9,248,835 B2 | 2/2016 | Tanzmeister | |
| 9,251,708 B2 | 2/2016 | Rosenbaum et al. | |
| 9,277,132 B2 | 3/2016 | Berberian | |
| 9,280,711 B2 | 3/2016 | Stein | |
| 9,282,144 B2 | 3/2016 | Tebay et al. | |
| 9,286,522 B2 | 3/2016 | Stein et al. | |
| 9,297,641 B2 | 3/2016 | Stein | |
| 9,299,004 B2 | 3/2016 | Lin et al. | |
| 9,315,192 B1 | 4/2016 | Zhu et al. | |
| 9,317,033 B2 | 4/2016 | Ibanez-Guzman et al. | |
| 9,317,776 B1 | 4/2016 | Honda et al. | |
| 9,330,334 B2 | 5/2016 | Lin et al. | |
| 9,342,074 B2 | 5/2016 | Dolgov et al. | |
| 9,347,779 B1 | 5/2016 | Lynch | |
| 9,355,635 B2 | 5/2016 | Gao et al. | |
| 9,365,214 B2 | 6/2016 | Ben Shalom et al. | |
| 9,399,397 B2 | 7/2016 | Mizutani et al. | |
| 9,418,549 B2 | 8/2016 | Kang et al. | |
| 9,428,192 B2 | 8/2016 | Schofield et al. | |
| 9,436,880 B2 | 9/2016 | Bos et al. | |
| 9,438,878 B2 | 9/2016 | Niebla et al. | |
| 9,443,163 B2 | 9/2016 | Springer | |
| 9,446,765 B2 | 9/2016 | Ben Shalom et al. | |
| 9,459,515 B2 | 10/2016 | Stein | |
| 9,466,006 B2 | 10/2016 | Duan | |
| 9,476,970 B1 * | 10/2016 | Fairfield | G06T 7/74 |
| 9,483,839 B1 | 11/2016 | Kwon et al. | |
| 9,490,064 B2 | 11/2016 | Hirosawa et al. | |
| 9,494,935 B2 | 11/2016 | Okumura et al. | |
| 9,507,346 B1 | 11/2016 | Levinson et al. | |
| 9,513,634 B2 | 12/2016 | Pack et al. | |
| 9,531,966 B2 | 12/2016 | Stein et al. | |
| 9,535,423 B1 | 1/2017 | Debreczeni | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,552,657 B2 * | 1/2017 | Ueno | H04N 7/183 |
| 9,555,803 B2 | 1/2017 | Pawlicki et al. | |
| 9,568,915 B1 | 2/2017 | Berntorp et al. | |
| 9,587,952 B1 | 3/2017 | Slusar | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,612,123 B1 | 4/2017 | Levinson et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,652,860 B1 | 5/2017 | Maali et al. | |
| 9,669,827 B1 | 6/2017 | Ferguson et al. | |
| 9,672,446 B1 | 6/2017 | Vallespi-Gonzalez | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,720,418 B2 | 8/2017 | Stenneth | |
| 9,723,097 B2 | 8/2017 | Harris et al. | |
| 9,723,099 B2 | 8/2017 | Chen et al. | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,738,280 B2 | 8/2017 | Rayes | |
| 9,739,609 B1 | 8/2017 | Lewis | |
| 9,746,550 B2 | 8/2017 | Nath et al. | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,792,507 B2 | 10/2017 | Das | |
| 9,805,294 B2 | 10/2017 | Liu et al. | |
| 9,810,785 B2 | 11/2017 | Grauer et al. | |
| 9,823,339 B2 | 11/2017 | Cohen | |
| 9,842,399 B2 * | 12/2017 | Yamaguchi | G06T 7/97 |
| 9,953,236 B1 | 4/2018 | Huang et al. | |
| 10,147,193 B2 | 12/2018 | Huang et al. | |
| 10,223,806 B1 | 3/2019 | Luo et al. | |
| 10,223,807 B1 | 3/2019 | Luo et al. | |
| 10,410,055 B2 | 9/2019 | Wang et al. | |
| 10,529,089 B2 | 1/2020 | Ahmad et al. | |
| 10,698,100 B2 | 6/2020 | Becker et al. | |
| 10,816,354 B2 | 10/2020 | Liu | |

(56) References Cited

U.S. PATENT DOCUMENTS

| | | | |
|---|---|---|---|
| 11,009,356 B2 | 5/2021 | Wang et al. | |
| 11,009,365 B2 | 5/2021 | Wang et al. | |
| 11,573,095 B2 | 2/2023 | Liu et al. | |
| 2001/0051845 A1 | 12/2001 | Itoh | |
| 2003/0114980 A1 | 6/2003 | Klausner et al. | |
| 2003/0174773 A1 | 9/2003 | Comaniciu et al. | |
| 2004/0264763 A1 | 12/2004 | Mas et al. | |
| 2007/0088497 A1* | 4/2007 | Jung | G01C 21/3647 348/113 |
| 2007/0183661 A1 | 8/2007 | El-Maleh et al. | |
| 2007/0183662 A1 | 8/2007 | Wang et al. | |
| 2007/0230792 A1 | 10/2007 | Shashua et al. | |
| 2007/0286526 A1 | 12/2007 | Abousleman et al. | |
| 2008/0109118 A1 | 5/2008 | Schwartz et al. | |
| 2008/0249667 A1 | 10/2008 | Hor et al. | |
| 2009/0040054 A1 | 2/2009 | Wang et al. | |
| 2009/0087029 A1 | 4/2009 | Coleman et al. | |
| 2009/0243825 A1* | 10/2009 | Schofield | G08G 1/163 340/435 |
| 2010/0049397 A1 | 2/2010 | Liu et al. | |
| 2010/0082238 A1* | 4/2010 | Nakamura | G01C 21/32 701/532 |
| 2010/0111417 A1 | 5/2010 | Ward et al. | |
| 2010/0226564 A1 | 9/2010 | Marchesotti et al. | |
| 2010/0281361 A1 | 11/2010 | Marchesotti | |
| 2011/0142283 A1 | 6/2011 | Huang et al. | |
| 2011/0206282 A1 | 8/2011 | Aisaka et al. | |
| 2011/0247031 A1 | 10/2011 | Jacoby | |
| 2012/0041636 A1 | 2/2012 | Johnson et al. | |
| 2012/0105639 A1 | 5/2012 | Stein et al. | |
| 2012/0120069 A1 | 5/2012 | Kodaira et al. | |
| 2012/0140076 A1 | 6/2012 | Rosenbaum et al. | |
| 2012/0274629 A1 | 11/2012 | Baek | |
| 2012/0314070 A1 | 12/2012 | Zhang et al. | |
| 2013/0051613 A1 | 2/2013 | Bobbitt et al. | |
| 2013/0083959 A1 | 4/2013 | Owechko et al. | |
| 2013/0182134 A1 | 7/2013 | Grundmann et al. | |
| 2013/0182957 A1 | 7/2013 | Wujcicki | |
| 2013/0204465 A1 | 8/2013 | Phillips et al. | |
| 2013/0266187 A1 | 10/2013 | Bulan et al. | |
| 2013/0329052 A1 | 12/2013 | Chew | |
| 2014/0063489 A1* | 3/2014 | Steffey | G01C 15/002 356/72 |
| 2014/0072170 A1 | 3/2014 | Zhang et al. | |
| 2014/0104051 A1 | 4/2014 | Breed | |
| 2014/0142799 A1 | 5/2014 | Ferguson et al. | |
| 2014/0143839 A1 | 5/2014 | Ricci | |
| 2014/0145516 A1 | 5/2014 | Hirosawa et al. | |
| 2014/0198184 A1 | 7/2014 | Stein et al. | |
| 2014/0270482 A1 | 9/2014 | Chakraborty | |
| 2014/0314322 A1* | 10/2014 | Snavely | G06T 7/74 382/190 |
| 2014/0321704 A1 | 10/2014 | Partis | |
| 2014/0334668 A1 | 11/2014 | Saund | |
| 2015/0057889 A1 | 2/2015 | Tamaizumi | |
| 2015/0062304 A1 | 3/2015 | Stein et al. | |
| 2015/0112765 A1 | 4/2015 | Sundaresh | |
| 2015/0127239 A1* | 5/2015 | Breed | G01S 19/13 701/70 |
| 2015/0253428 A1* | 9/2015 | Holz | G01S 7/483 356/5.01 |
| 2015/0269437 A1 | 9/2015 | Maruyama et al. | |
| 2015/0269438 A1 | 9/2015 | Samarasekera et al. | |
| 2015/0292891 A1* | 10/2015 | Kojo | G01S 5/16 701/523 |
| 2015/0310370 A1 | 10/2015 | Burry et al. | |
| 2015/0353082 A1 | 12/2015 | Lee et al. | |
| 2015/0354976 A1 | 12/2015 | Ferencz | |
| 2016/0008988 A1 | 1/2016 | Kennedy et al. | |
| 2016/0026787 A1 | 1/2016 | Nairn et al. | |
| 2016/0037064 A1 | 2/2016 | Stein et al. | |
| 2016/0046290 A1 | 2/2016 | Aharony et al. | |
| 2016/0094774 A1 | 3/2016 | Li et al. | |
| 2016/0118080 A1 | 4/2016 | Chen | |
| 2016/0125608 A1 | 5/2016 | Sorstedt | |
| 2016/0129907 A1 | 5/2016 | Kim et al. | |
| 2016/0165157 A1 | 6/2016 | Stein et al. | |
| 2016/0191860 A1* | 6/2016 | Jung | H04N 23/698 348/143 |
| 2016/0210528 A1 | 7/2016 | Duan | |
| 2016/0275766 A1 | 9/2016 | Venetianer et al. | |
| 2016/0321381 A1 | 11/2016 | English et al. | |
| 2016/0321817 A1 | 11/2016 | Ratcliff et al. | |
| 2016/0327948 A1 | 11/2016 | Taguchi | |
| 2016/0334230 A1 | 11/2016 | Ross et al. | |
| 2016/0342837 A1 | 11/2016 | Hong et al. | |
| 2016/0347322 A1 | 12/2016 | Clarke et al. | |
| 2016/0375907 A1 | 12/2016 | Erban | |
| 2017/0008521 A1 | 1/2017 | Braunstein | |
| 2017/0039436 A1 | 2/2017 | Chen | |
| 2017/0053169 A1 | 2/2017 | Cuban et al. | |
| 2017/0061632 A1 | 3/2017 | Lindner et al. | |
| 2017/0124476 A1 | 5/2017 | Levinson et al. | |
| 2017/0134631 A1 | 5/2017 | Zhao et al. | |
| 2017/0177951 A1 | 6/2017 | Yang et al. | |
| 2017/0227647 A1* | 8/2017 | Baik | G01S 19/485 |
| 2017/0301104 A1 | 10/2017 | Qian et al. | |
| 2017/0305423 A1 | 10/2017 | Green | |
| 2017/0318407 A1 | 11/2017 | Meister et al. | |
| 2017/0363423 A1 | 12/2017 | Dormody et al. | |
| 2017/0366945 A1 | 12/2017 | Uliyar | |
| 2018/0005407 A1* | 1/2018 | Browning | G05D 1/024 |
| 2018/0111274 A1* | 4/2018 | Seok | G05D 1/0027 |
| 2018/0120859 A1 | 5/2018 | Eagelberg | |
| 2018/0131924 A1* | 5/2018 | Jung | G01C 21/3822 |
| 2018/0149739 A1* | 5/2018 | Becker | G01S 13/86 |
| 2018/0151063 A1 | 5/2018 | Pun et al. | |
| 2018/0158197 A1 | 6/2018 | Dasgupta et al. | |
| 2018/0188043 A1* | 7/2018 | Chen | G06T 7/74 |
| 2018/0216943 A1* | 8/2018 | Hawkins | G05D 1/0274 |
| 2018/0260956 A1 | 9/2018 | Huang et al. | |
| 2018/0268566 A1 | 9/2018 | Houts et al. | |
| 2018/0283892 A1 | 10/2018 | Behrendt | |
| 2018/0284278 A1* | 10/2018 | Russell | G01S 17/89 |
| 2018/0312125 A1 | 11/2018 | Jung et al. | |
| 2018/0315201 A1* | 11/2018 | Cameron | G06T 7/70 |
| 2018/0364717 A1* | 12/2018 | Douillard | G01S 17/931 |
| 2018/0373254 A1 | 12/2018 | Song | |
| 2018/0373980 A1* | 12/2018 | Huval | G06F 18/41 |
| 2019/0025853 A1 | 1/2019 | Julian | |
| 2019/0063945 A1 | 2/2019 | Liu | |
| 2019/0065863 A1 | 2/2019 | Luo et al. | |
| 2019/0066329 A1 | 2/2019 | Luo et al. | |
| 2019/0066330 A1 | 2/2019 | Luo et al. | |
| 2019/0108384 A1 | 4/2019 | Wang et al. | |
| 2019/0132391 A1 | 5/2019 | Thomas et al. | |
| 2019/0132392 A1 | 5/2019 | Liu et al. | |
| 2019/0163989 A1* | 5/2019 | Guo | G06F 18/251 |
| 2019/0210564 A1 | 7/2019 | Han et al. | |
| 2019/0210613 A1 | 7/2019 | Sun et al. | |
| 2019/0226851 A1* | 7/2019 | Nicosevici | G06F 18/28 |
| 2019/0236950 A1 | 8/2019 | Li et al. | |
| 2019/0266420 A1 | 8/2019 | Ge et al. | |
| 2019/0271549 A1 | 9/2019 | Zhang et al. | |
| 2019/0312993 A1 | 10/2019 | Yamashita et al. | |
| 2019/0339084 A1* | 11/2019 | Korenaga | G01C 21/30 |
| 2020/0089973 A1 | 3/2020 | Efland | |
| 2020/0271453 A1 | 8/2020 | Wang et al. | |
| 2020/0271473 A1 | 8/2020 | Wang et al. | |
| 2021/0033420 A1 | 2/2021 | Liu | |
| 2021/0183099 A1 | 6/2021 | Fujii et al. | |
| 2021/0278221 A1 | 9/2021 | Wang et al. | |
| 2021/0319584 A1 | 10/2021 | Qian et al. | |
| 2021/0373161 A1 | 12/2021 | Lu et al. | |
| 2023/0160712 A1 | 5/2023 | Liu et al. | |

FOREIGN PATENT DOCUMENTS

| | | |
|---|---|---|
| CN | 105667518 A | 6/2016 |
| CN | 105825173 A | 8/2016 |
| CN | 106340197 A | 1/2017 |
| CN | 106781591 A | 5/2017 |
| CN | 106909876 A | 6/2017 |

(56) References Cited

FOREIGN PATENT DOCUMENTS

| | | | |
|---|---|---|---|
| CN | 107015238 A | 8/2017 | |
| CN | 107111742 A | 8/2017 | |
| CN | 108010360 A | 5/2018 | |
| CN | 111256693 A | 6/2020 | |
| DE | 2608513 A1 | 9/1977 | |
| EP | 0890470 A2 | 1/1999 | |
| EP | 1754179 A1 | 2/2007 | |
| EP | 2448251 A2 | 5/2012 | |
| EP | 2463843 A2 | 6/2012 | |
| EP | 2761249 A1 | 8/2014 | |
| EP | 2918974 A1 | 9/2015 | |
| EP | 2946336 A2 | 11/2015 | |
| EP | 2993654 A1 | 3/2016 | |
| EP | 3081419 A1 | 10/2016 | |
| EP | 3819673 A1 | 5/2021 | |
| JP | 2017198566 A | 11/2017 | |
| KR | 100802511 B1 | 2/2008 | |
| KR | 20170065083 A | 6/2017 | |
| WO | 1991009375 A1 | 6/1991 | |
| WO | 2005098739 A1 | 10/2005 | |
| WO | 2005098751 A1 | 10/2005 | |
| WO | 2005098782 A1 | 10/2005 | |
| WO | 2010109419 A1 | 9/2010 | |
| WO | 2013045612 A1 | 4/2013 | |
| WO | 2014111814 A2 | 7/2014 | |
| WO | 2014166245 A1 | 10/2014 | |
| WO | 2014201324 A1 | 12/2014 | |
| WO | 2015083009 A1 | 6/2015 | |
| WO | 2015103159 A1 | 7/2015 | |
| WO | 2015125022 A2 | 8/2015 | |
| WO | 2015186002 A2 | 12/2015 | |
| WO | 2016090282 A1 | 6/2016 | |
| WO | 2016135736 A2 | 9/2016 | |
| WO | 2017013875 A1 | 1/2017 | |
| WO | 2017079349 A1 | 5/2017 | |
| WO | 2017079460 A2 | 5/2017 | |
| WO | 2018132608 A2 | 7/2018 | |
| WO | 2019040800 A1 | 2/2019 | |
| WO | 2019084491 A1 | 5/2019 | |
| WO | 2019084494 A1 | 5/2019 | |
| WO | 2019140277 A2 | 7/2019 | |
| WO | 2019161134 A1 | 8/2019 | |
| WO | 2019168986 A1 | 9/2019 | |
| WO | 2020038118 A1 | 2/2020 | |
| WO | 2020097512 A2 | 5/2020 | |
| WO | 2021017213 A1 | 2/2021 | |

OTHER PUBLICATIONS

Harry Y. Oh, U.S. Appl. No. 15/896,077, Final Office Action Mailed Jul. 9, 2020, pp. 1-30.
Harry Y. Oh, U.S. Appl. No. 15/896,077, Non-Final Office Action Mailed Oct. 1, 2020, pp. 1-34.
International application No. PCT/US2019/060547 International Search Report and Written Opinion, Mailed Jun. 25, 2020, pp. 1-23.
Carle, Patrick J.F., "Global Rover Localization by Matching Lidar and Orbital 3D Maps.", IEEE, Anchorage Convention Distriction, pp. 1-6, May 3-8, 2010. (Anchorage Alaska, US), May 3-8, 2019.
Young, Lee W., International Application No. PCT/US19/18113 Search Report and Written Opinion Mailed May 8, 2019. (pp. 1-13).
Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.
Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.
Sattler, T. et al., "Are Large-Scale 3D Models Really Necessary for Accurate Visual Localization?" CVPR, IEEE, 2017, pp. 1-10.
Engel J., et al., LSD-SLAM: Large-Scale Direct Monocular SLAM. In: Fleet D., Pajdla T., Schiele B., Tuytelaars T. (eds) Computer Vision—ECCV 2014. ECCV 2014. Lecture Notes in Computer Science, vol. 8690. Springer, Cham.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.
International Application No. PCT/US2019/013322, International Search Report and Written Opinion Mailed Apr. 2, 2019.
International Application No. PCT/US19/12934, International Search Report and Written Opinion Mailed Apr. 29, 2019.
International Application No. PCT/US18/53795, International Search Report and Written Opinion Mailed Dec. 31, 2018.
International Application No. PCT/US18/57484, International Search Report and Written Opinion Mailed Jan. 7, 2019.
International Application No. PCT/US2018/057851, International Search Report and Written Opinion Mailed Feb. 1, 2019.
International Application No. PCT/US2019/019839, International Search Report and Written Opinion Mailed May 23, 2019.
International Application No. PCT/US19/25995, International Search Report and Written Opinion Mailed Jul. 9, 2019.
Geiger, Andreas et al., "Automatic Camera and Range Sensor Calibration using a single Shot", Robotics and Automation (ICRA), pp. 1-8, 2012 IEEE International Conference.
Zhang, Z. et al. A Flexible new technique for camera calibration. IEEE Transactions on Pattern Analysis and Machine Intelligence (vol. 22, Issue: 11, Nov. 2000).
International Application No. PCT/US2018/047830, International Search Report and Written Opinion Mailed Apr. 27, 2017.
Bar-Hillel, Aharon et al. "Recent progress in road and lane detection: a survey." Machine Vision and Applications 25 (2011): 727-745.
Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.
International Application No. PCT/US2018/047608, International Search Report and Written Opinion Mailed Dec. 28, 2018.
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching For Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.

(56) References Cited

OTHER PUBLICATIONS

Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds" http://www.vision.caltech.edu/visipedia/papers/WelinderEtalNIPS10.pdf, 2010.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Office Action Mailed in Chinese Application No. 201810025516.X, Mailed Sep. 3, 2019.
Luo, Yi et al. U.S. Appl. No. 15/684,389 Notice of Allowance Mailed Oct. 9, 2019.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/ Suspension System While Traversing Road Irregularities," in IEEE Transactions on Neural Networks, vol. 19, No. 9, pp. 1549-1563, Sep. 2008.
Siyuan Liu, U.S. Appl. No. 17/074,468 Notice of Allowance mailed Oct. 7, 2022, p. 1-7.
Chenzhe Qian, U.S. Appl. No. 17/225,396, Non-Final Office Action Mailed Oct. 24, 2022, pp. 1-19.
Chinese Patent Office, First Office Action for CN 201880055025.8, Mailing Date: Dec. 16, 2022, 10 pages.
Schindler, et al., "Generation of High Precision Digitial Maps using Circular Arc Splines," 2012 Intelligent Vehicles Symposium, Alcala de Henares, Spain, Jun. 3-7, 2012.
Examination Report from corresponding European Patent Application No. 21166828.0, dated Mar. 16, 2023 (8 pages).
Xiao Zhongyang et al: "Monocular Vehicle Self-localization method based on Compact Semantic Map", (2018 21st International Conference On Intelligent Transportation Systems (ITSC), IEEE, Nov. 4, 2018, pp. 3083-3090.
U.S. Patent & Trademark Office, Non-Final Office Action for U.S. Appl. No. 17/308,803, mailed Mar. 16, 2023, 25 pages.
Harry Y. Oh, U.S. Appl. No. 16/184,926, Non-Final Office Action Mailed Oct. 5, 2020, pp. 1-17.
Mingdong Wang et al., U.S. Appl. No. 16/184,926 Notice of Allowance Mailed Jan. 15, 2021, pp. 1-5.
Chinese Patent Office, First Search Report for CN 201980013350.2, Mailing Date: Feb. 21, 2022, 3 pages with machine translation.
Chinese Patent Office, First Office Action for CN 201980013350.2, Mailing Date: Feb. 25, 2022, 20 pages with machine translation.
Extended European Search Report for European Patent Application No. 18849237.5, mailed Apr. 23, 2021.
Extended European Search Report for European Patent Application No. 21166828.0, mailed Aug. 5, 2021 (8 pages).
Gurghian, A., et al., "DeepLanes: End-To-End Lane Position Estimation using Deep Neural Networks", 2016 IEEE Conference on Computer Vision and Pattern Recognition Workshops, pp. 38-45.
Nguyen, Trung Bao, "Evaluation of Lane Detection Algorithms based on an Embedded Platform," Jun. 30, 2017, Chapters 3 and 4, pp. 1-107; Master Thesis, Technische Universitat Chemnitz, Jun. 2017, available at https://nbnresolving.org/urn:nbn:de:bsz:ch1-qucosa-226615.

(56) References Cited

OTHER PUBLICATIONS

Niu, J., et al., "Robust Lane Detection using Two-stage Feature Extraction with Curve Fitting", Pattern Recognition, Elsevier, 59, pp. 225-233 (2016).
Narote, S., et al., "A review of recent advances in lane detection and departure warning system", Pattern Recognition, Elsevier, 73, pp. 216-234 (2018).
Mingdong Wang, U.S. Appl. No. 17/320,888, Non-Final Office Action Mailed Jan. 18, 2023, pp. 1-8.
U.S. Patent & Trademark Office, Final Office Action for U.S. Appl. No. 17/225,396, mailed Mar. 16, 2023, 20 pages.
U.S. Patent & Trademark Office, Non-Final Office Action for U.S. Appl. No. 18/545,801, mailed Sep. 5, 2024, 24 pages.
U.S. Patent & Trademark Office, Notice of Allowance for U.S. Appl. No. 17/225,396, mailed Jul. 25, 2023, 10 pages.
U.S. Patent & Trademark Office, Notice of Allowance for U.S. Appl. No. 17/308,803, mailed Aug. 14, 2023, 7 pages.
U.S. Patent & Trademark Office, Notice of Allowance for U.S. Appl. No. 17/320,888, mailed Apr. 19, 2023, 8 pages.

* cited by examiner

LANE MARKING LOCALIZATION AND FUSION

CROSS-REFERENCE TO RELATED APPLICATIONS

This patent application is a continuation of U.S. patent application Ser. No. 17/320,888, filed on May 14, 2021, which is a continuation of U.S. patent application Ser. No. 16/184,926, filed on Nov. 8, 2018, which is a continuation-in-part and claims priority to and the benefit of U.S. patent application Ser. No. 15/896,077, filed on Feb. 14, 2018. The aforementioned applications of which are incorporated herein by reference in their entireties.

BACKGROUND OF THE INVENTION

1. Field of Invention

The present invention relates to GPS positioning and, more specifically, a system and method for fusing localizations upon a roadway.

2. Description of Related Art

Global positioning satellite ("GPS") technology is widely used as a means for locating an automobile upon a roadway. As autonomous and semi-autonomous vehicles become more advanced, accurately knowing the vehicle's position in the roadway becomes critical. For example, self-driving cars by Volvo and Tesla have been easily confused by faded lane markers and other shabby road conditions. Further, current GPS technology is inaccurate. To achieve a fully autonomous self-driving vehicle requires the ability of a computer to determine the vehicle's lateral position within a roadway with great precision. Additionally, advanced driver-assistance systems ("ADAS") benefit greatly from this ability. For example, lane keeping assistance ("LKA") systems, lane departure warning ("LDW") systems, and lane change assistance systems would be greatly benefited by accurately knowing the vehicle's lateral position within a lane. Other examples of ADAS systems include adaptive cruise control, adaptive light control, anti-lock braking systems, automatic parking, blind spot monitoring, collision avoidance systems, intersection detection, lane departure warning systems, parking sensors, turning assistance, and wrong-way driving warning.

A vehicle may utilize various levels of autonomous driving. For example, a first level of autonomous driving may assist a human driver during some driving tasks such as steering or engine acceleration/deceleration. A second level of autonomous driving may conduct some steering and acceleration/deceleration while the human driver monitors the driving environment and controls the remaining driving tasks. Such a system is referred to as a partially automated system. A third level of autonomous driving may conduct driving tasks and monitor the driving environment, but the human driver must be ready to retake control when the automated system requests. Such a system is generally referred to as a conditionally automated system. A fourth level of autonomous driving may drive the vehicle and monitor road conditions; the human driver does not need to take control but the system may only operate in specific conditions and environments such as inside of a factory, on a closed road course, or within a bounded area. Such a system is referred to as a highly automated system. A fifth level of autonomous driving may perform all driving and road-monitoring tasks in all driving conditions. Such a system is referred to as a fully-automated system.

Current technology relies on GPS technology to determine a vehicle's lateral position within a roadway. However, this method is susceptible to a high amount of drift—the lateral area around the vehicle that is within the technology's margin of error. The amount of drift in a given system is dependent on many factors including signal strength and the precision of the GPS hardware being used. Typical GPS devices aimed at the average consumer have a drift of about 10 meters. Even with the most precise instruments having the best signal strength, a system experiences a drift of 1-2 meters or more, which is unacceptable for self-driving vehicles.

To improve the accuracy of GPS positioning, current technology also employs an inertial measurement unit ("IMU"). An IMU is an electronic device that measures and reports a vehicle's specific force and angular rate using a combination of accelerometers and gyroscopes. However, even while being augmented with IMU's, current lateral locating methods and systems still experience a high amount of drift. For such a system to be useful in a self-driving vehicle, the resolution needs to be approximately 10 cm or less.

Therefore, what is needed is a system that can utilize GPS information and determine a vehicle's lateral position within a roadway with great accuracy. This need has heretofore remained unsatisfied.

SUMMARY OF THE INVENTION

The present invention overcomes these and other deficiencies of the prior art by providing a system and method for determining a vehicle's location within a roadway lane by comparing information relating to the vehicle's environment against regional information stored in a database. To improve the accuracy of the vehicle's predicted location, the present invention may further utilize previously determined predicted locations fused with vehicle's instant predicted location. In an exemplary embodiment, the present invention comprises a method for determining a vehicle's location comprising the steps of approximating the vehicle's region; receiving a region map from a database, wherein the region map corresponds to the vehicle's approximated region and comprises a plurality of region points indicating an expected roadway lane; receiving a first response image generated by a first imaging device, the first response image comprising information relating to the vehicle's environment; generating a first response map from the first response image, the first response map comprising a plurality of first response points indicating the vehicle's location; comparing the first response map to the region map; and predicting the vehicle's location based on the differences between the first response points and the region points.

In another exemplary embodiment, the present invention further comprises the steps of receiving a second response image generated by a second imaging device, the second response image comprising information relating to the vehicle's environment; generating a second response map from the second response image, the second response map comprising a plurality of second response points indicating the vehicle's location; and comparing the second response map to the region map; wherein the step of predicting the vehicle's location further comprises comparing the differences between the second response points, the first response points, and the region points.

In another exemplary embodiment, the present invention further comprises the steps of receiving a third response image generated by a third imaging device, the third response image comprising information relating to the vehicle's environment; generating a third response map from the third response image, the third response map comprising a plurality of third response points indicating the vehicle's location; and comparing the third response map to the region map; wherein the step of predicting the vehicle's location further comprises comparing the differences between the third response points, second response points, the first response points, and the region points.

In another exemplary embodiment, the vehicle's region may be approximated using a GPS device or an IMU device.

In another exemplary embodiment, the step of generating a response map may further comprises the steps of detecting lane markers in the response image, the lane markers pertaining to physical aspects contained in the response image; and plotting the response points on the response map, the response points indicating locations of the lane markers.

In another exemplary embodiment, the present invention may further comprise the step of generating a confidence score.

In another exemplary embodiment, the response image may be generated from radar sensing equipment, LIDAR sensing equipment, GPS sensing information, and/or images.

In another exemplary embodiment, the region map and response map may be compared at a selected frequency.

In another exemplary embodiment, the selected frequency may be at least 20 cycles per second.

In another exemplary embodiment, the present invention may further comprise the step of outputting the vehicle's predicted location to an ADAS.

In another exemplary embodiment, the first imaging device, the second imaging device, and the third imaging device may be each adapted to perceive different aspects of the vehicle's environment.

In another exemplary embodiment, the present invention comprises a system for determining a vehicle's location on a roadway comprising a locating device adapted to determine a vehicle's geographic region; a database comprising a plurality of region maps, the region maps comprising a plurality of region points; a first imaging device adapted to perceive information relating to the vehicle's environment; a processor operably connected to the locating device, the database, and the first imaging device, the processor, at a predetermined frequency, adapted to receive, from the locating device, the vehicle's determined geographic region; receive, from the database, the region map corresponding to the vehicle's determined geographic region; receive, from the first imaging device, information perceived relating to the vehicle's environment; generate a first response map, the first response map comprising a plurality of first response points corresponding to lane markers detected within the first response map; compare the first response map to the region map; and determine the vehicle's predicted location based on the comparison of the region map and the first response map.

In another exemplary embodiment, the processor may be further configured to generate a fused vehicle location comprising the vehicle's predicted location and a previously determined vehicle location.

In another exemplary embodiment, the present invention may further comprise a second imaging device adapted to perceive information relating to the vehicle's environment; wherein the processor is further adapted to receive, from the second imaging device, information perceived relating to the vehicle's environment; generate a second response map, from the second response map comprising a plurality of second response points corresponding to lane markers detected within the second response map; and determine the vehicle's predicted location based on the comparison of the region map, the first response map, and the second response map.

In another exemplary embodiment, the present invention may further comprise a third imaging device adapted to perceive information relating to the vehicle's environment; wherein the processor is further adapted to receive, from the third imaging device, information perceived relating to the vehicle's environment; generate a third response map, from the third response map comprising a plurality of third response points corresponding to lane markers detected within the third response map; and determine the vehicle's predicted location based on the comparison of the region map, the first response map, the second response map, and the third response map.

In another exemplary embodiment, the locating device may comprise a GPS device or an IMU device.

In another exemplary embodiment, the imaging device may comprise a camera or a LIDAR device.

In another exemplary embodiment, the predetermined frequency may be at least 20 cycles per second.

In another exemplary embodiment, the processor may be further configured to output the vehicle's predicted location to an ADAS.

In another exemplary embodiment, the processor may be further configured to determine a confidence score.

In another exemplary embodiment, the first imaging device, the second imaging device, and the third imaging device may be each adapted to perceive different aspects of the vehicle's environment.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
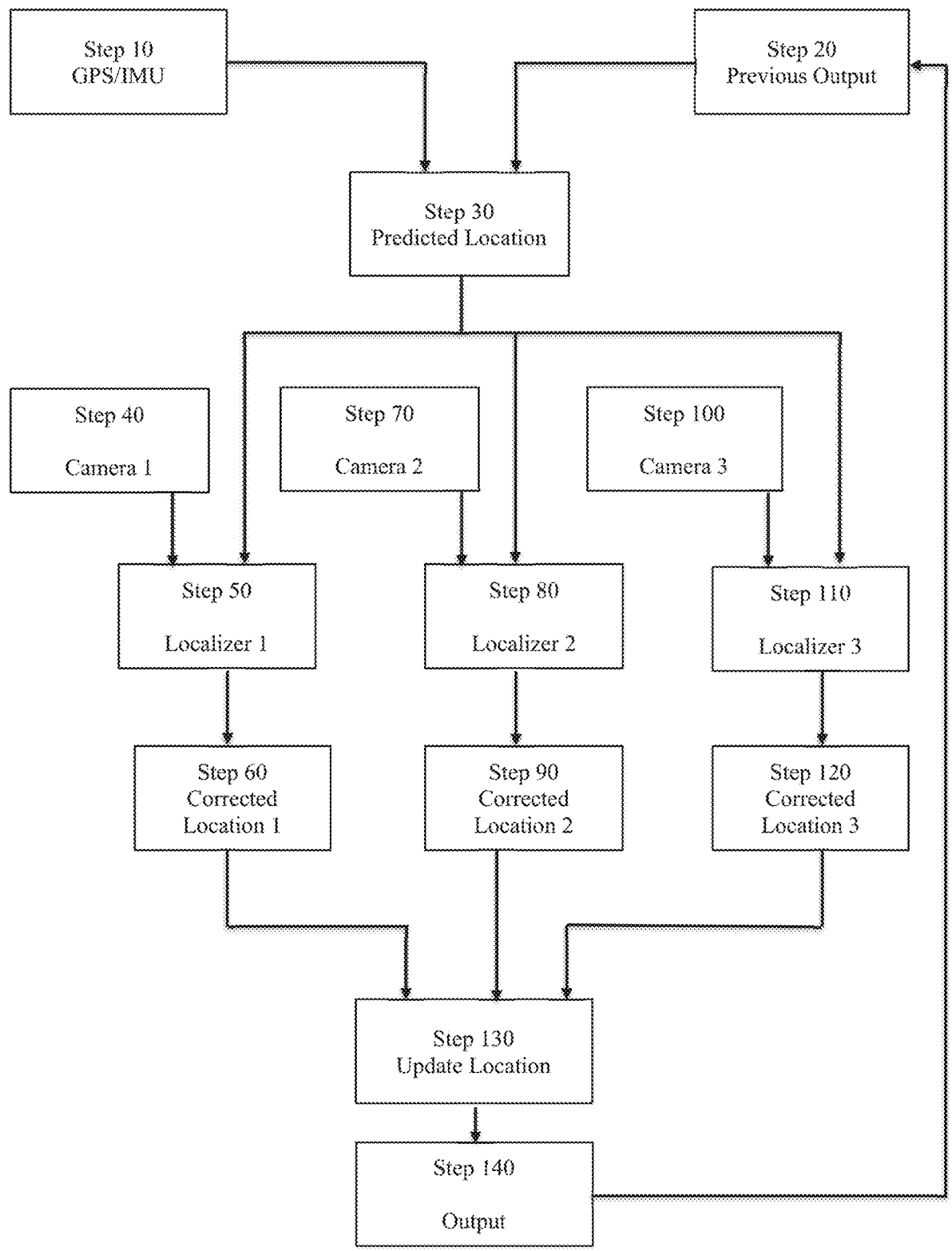
FIG. 1 illustrates a flowchart showing the exemplary steps of lane marking localization and fusion, according to an exemplary embodiment of the present disclosure.

Further features and advantages of the invention, as well as the structure and operation of various embodiments of the invention, are described in detail below with reference to the accompanying FIGS. 1-4. Although the invention is described in the context of a system, any system or method may be implemented.

In an exemplary embodiment of the present disclosure, the system may utilize pieces of hardware including a plurality of cameras installed on a vehicle, a database, and an on-board computer, to iteratively update the vehicle's location and position relative to the lane of traffic in which it is traveling.

In an embodiment, the plurality of cameras may be installed on the vehicle and their positions and view angles are predetermined relative to the rest of the vehicle on which it is installed. In another embodiment, the plurality of cameras comprises three cameras: a first camera, a second camera, and a third camera. In one embodiment, all three cameras are installed on the vehicle in substantially the same location on the vehicle having substantially the same viewing angle. Such an embodiment would be used to provide redundancy in the event one of the cameras failed. In another embodiment, the three cameras are installed on the vehicle at different locations with different viewing angles. Such an embodiment is used to increase the accuracy of lane marking localization and fusion system in that the more viewing angles the system has to fuse location data, the greater the accuracy will be. As contemplated herein, the plurality of cameras may be installed such that they are permanently, semi-permanently, or temporarily attached to the vehicle. For example, one or more of the plurality of camera may be installed onto the vehicle such that it is integrated into the vehicle. In such an example, the camera may be installed such that it is permanently installed on the vehicle. In another example, one or more of the plurality of cameras is installed on the vehicle such that it is easily removable from the vehicle, thereby allowing the user to remove and reinstall it on another vehicle. Further, the plurality of cameras need not be dedicated to the use of the present disclosure. For example, one or more of the plurality of cameras may be embodied by cellular telephones having a built-in camera. In such an embodiment, the on-board computer may be configured to communicatively connect to the cellular telephone and receive imaging data therefrom.

In another embodiment of the present disclosure, the plurality of cameras may have different focus points and different aperture sizes. In such an embodiment, for example, the first camera may have a focus point close to the front of the vehicle such that the first camera will have the most accurate information close to the vehicle. Further in such an embodiment, the third camera may have a focus point far from the front of the vehicle in the direction of travel. In such an embodiment, the third camera will have the greatest accuracy capturing images far off into the distance. In another embodiment, the second camera may have a large aperture to allow the camera to more sensitive in low light conditions. In another embodiment, one of the plurality of cameras may be configured to capture a spectrum of light different than what is visible to the human eye. For example, one of the cameras may be configured to capture infrared light while another may be configured to capture ultraviolet light. As contemplated herein, a camera is any device that is capable of capturing location information of the environment in which the vehicle is traveling.

In an embodiment, the on-board computer may be permanently installed into the vehicle. In such an embodiment, the computer may be dedicated for use with the present disclosure.

In an embodiment, the computer fetches data from the camera and generates a response map. The on-board computer fetches data from the database to create a lane map. The on-board computer compares the response map against the lane map to determine a score. If the score is below a predetermined threshold, the on-board computer updates the vehicle position. In an embodiment, the system may output the updated location information to another on-board system. Such a system may be an automated self-driving system that steers the vehicles. In another embodiment, such a system may also be an ADAS.

FIG. 1 illustrates an exemplary flowchart describing the steps in a system for lane marking localization and fusion according to an exemplary embodiment of the invention. In an exemplary embodiment of the present disclosure and with reference to FIG. 1, at step 10, the system fetches GPS and/or IMU location information. In an exemplary embodiment of the present disclosure, the system is utilized on a vehicle. The system may use an on-board GPS device to fetch the vehicle's location on the planet. In another embodiment, the system uses an on-board IMU in conjunction with an on-board GPS device to estimate the vehicle's location, speed, and velocity. In another embodiment, the GPS information comprises the latitude and/or longitude position of the vehicle. In another embodiment, the GPS information comprises the vehicle's yaw angle. In another embodiment, the GPS/IMU signal also comprises a time stamp.

In another exemplary embodiment of the present disclosure and with reference to FIG. 1, at step 20, the system fetches the vehicle's previous determined location.

In another exemplary embodiment of the present disclosure and with reference to FIG. 1, at step 30, the system generates a predicted location. In one embodiment, the system uses the GPS/IMU location information to predict the vehicle's location. In another embodiment, the system uses the GPS/IMU information in conjunction with the vehicle's previous location as supplied by the system to generate a predicted location. Additionally, the predicted location comprises information pertaining to the vehicle's location relative to the lane in which it is traveling. Additionally, the system may use the vehicle's pervious location in conjunction with the fetched average speed and time difference from the previous output to estimate the vehicle's current location within a roadway.

In another exemplary embodiment of the present disclosure and with reference to FIG. 1, at step 40, the system captures information from a first camera. In one embodiment, the first camera is installed on the vehicle. In another embodiment, the first camera may be temporarily affixed to the vehicle such that it may be easily installed and removed by a user. In an embodiment, the first camera may be installed such that it points in the direction of travel, i.e., towards the front of the vehicle. In another embodiment, the first camera may be installed such that it points in a direction other than the direction of travel, i.e., towards the rear or a side of the vehicle. In another embodiment, the first camera comprises a video camera gathering video at a predetermined frame rate. In an embodiment, the first camera comprises a video camera with frame rate of at least 10 frames per second. In another embodiment, the first camera comprises a photographic camera capturing images at a predetermined rate. In an embodiment, the first camera comprises a photographic camera capturing images at rate of at least 10 frames per second.

In another exemplary embodiment of the present disclosure and with reference to FIG. 1, at step 50, the system uses a first localizer to predict the vehicle's location. In an embodiment, the system generates a first region map based on location information stored in a database. Such location information may comprise information previously gathered using GPS, radar, photographic, videographic, and/or light detection and ranging ("LIDAR") technologies. In an embodiment, the system uses the vehicle's predicted location to generate the first region map. In such an embodiment, the system takes the vehicle's predicted location based on the GPS/IMU and/or the previous output to predict the location, speed, and direction of travel of the vehicle. In another embodiment, the system generates the first region map by defining structures that are predicted to be within the region map as defined by the vehicle's predicted location. In one embodiment, the structures defined within the region map include those pertaining to lanes of travel on which the vehicle is traveling. For example, the structures defined include lines painted on the roadway and reflectors installed upon the roadway. In another embodiment, the structures defined within the region map include those observable by the system and include buildings, street signs, street lights, bridges, as well as reflectors and lines painted on the roadway. In another embodiment, the structures defined within the region map include other permanent or semi-permanent structures including trees and other landscaping objects.

In another exemplary embodiment of the present disclosure and with continued reference to FIG. 1, at step 50, the system generates a first response map based on the information gathered by the first camera. The response map comprises information pertaining to the same structures as defined in the first region map. In another embodiment, the system compares the first region map with the first response map and calculates a confidence score.

In another exemplary embodiment of the present disclosure and with reference to FIG. 1, at step 60, the system generates a first corrected vehicle location based on the confidence score calculated by the first localizer. In an embodiment, the first corrected vehicle location is the same as the predicted location if the confidence score is 100%. In another embodiment, the system generates a first corrected location if the calculated confidence score is below a predetermined threshold. In such an embodiment, the system generates the first corrected location based on the vehicle's predicted location and a comparison of the first region map with the first response map.

In another exemplary embodiment of the present disclosure and with reference to FIG. 1, at step 70, the system captures information from a second camera. In one embodiment, the second camera is installed on the vehicle. In another embodiment, the second camera may be installed such that it points in the direction of travel, i.e., towards the front of the vehicle. In another embodiment, the second camera may be installed such that it points in a direction other than the direction of travel, i.e., towards the rear or a side of the vehicle. In another embodiment, the second camera comprises a video camera gathering video at a predetermined frame rate. In an embodiment, the second camera comprises a video camera with frame rate of at least 10 frames per second. In another embodiment, the second camera comprises a photographic camera capturing images at a predetermined rate. In an embodiment, the second camera comprises a photographic camera capturing images at rate of at least 10 frames per second.

In another exemplary embodiment of the present disclosure and with reference to FIG. 1, at step 80, the system uses a second localizer to predict the vehicle's location. In an embodiment, the system generates a second region map based on location information stored in a database. Such location information may comprise information previously gathered using GPS, radar, photographic, videographic, and/or LIDAR technologies. In an embodiment, the system uses the vehicle's predicted location to generate the second region map. In such an embodiment, the system takes the vehicle's predicted location based on the GPS/IMU and/or the previous output to predict the location, speed, and direction of travel of the vehicle. In another embodiment, the system generates the second region map by defining structures that are predicted to be within the region map as defined by the vehicle's predicted location. In one embodiment, the structures defined within the region map include those pertaining to lanes of travel on which the vehicle is traveling. For example, the structures defined include lines painted on the roadway and reflectors installed upon the roadway. In another embodiment, the structures defined within the region map include those observable by the system and include buildings, street signs, street lights, bridges, as well as reflectors and lines painted on the roadway. In another embodiment, the structures defined within the region map include other permanent or semi-permanent structures including trees and other landscaping objects.

In another exemplary embodiment of the present disclosure and with continued reference to FIG. 1, at step 80, the system generates a second response map based on the information gathered by the second camera. The second response map comprises information pertaining to the same structures as defined in the second region map. In another embodiment, the system compares the second region map with the second response map and calculates a confidence score.

In another exemplary embodiment of the present disclosure and with reference to FIG. 1, at step 90, the system generates a second corrected vehicle location based on the confidence score calculated by the second localizer. In an embodiment, the second corrected vehicle location is the same as the predicted location if the confidence score is 100%. In another embodiment, the system generates the second corrected location if the calculated confidence score is below a predetermined threshold. In such an embodiment, the system generates the second corrected location based on the vehicle's predicted location and a comparison of the second region map with the second response map.

In another exemplary embodiment of the present disclosure and with reference to FIG. 1, at step 100, the system captures information from a third camera. In one embodiment, the third camera is installed on the vehicle. In an embodiment, the third camera may be installed such that it points in the direction of travel, i.e., towards the front of the vehicle. In another embodiment, the third camera may be installed such that it points in a direction other than the direction of travel, i.e., towards the rear or a side of the vehicle. In another embodiment, the third camera comprises a video camera gathering video at a predetermined frame rate. In an embodiment, the third camera comprises a video camera with frame rate of at least 10 frames per second. In another embodiment, the third camera comprises a photographic camera capturing images at a predetermined rate. In an embodiment, the third camera comprises a photographic camera capturing images at rate of at least 10 frames per second.

In another exemplary embodiment of the present disclosure and with reference to FIG. 1, at step 110, the system uses a third localizer to predict the vehicle's location. In an embodiment, the system generates a third region map based on location information stored in a database. Such location information may comprise information previously gathered using GPS, radar, photographic, videographic, and/or LIDAR technologies. In an embodiment, the system uses the vehicle's predicted location to generate the third region map. In such an embodiment, the system takes the vehicle's predicted location based on the GPS/IMU and/or the previous output to predict the location, speed, and direction of travel of the vehicle. In another embodiment, the system generates the third region map by defining structures that are predicted to be within the region map as defined by the vehicle's predicted location. In one embodiment, the structures defined within the region map include those pertaining to lanes of travel on which the vehicle is traveling. For example, the structures defined include lines painted on the roadway and reflectors installed upon the roadway. In another embodiment, the structures defined within the region map include those observable by the system and include buildings, street signs, street lights, bridges, as well as reflectors and lines painted on the roadway. In another embodiment, the structures defined within the region map include other permanent or semi-permanent structures including trees and other landscaping objects.

In another exemplary embodiment of the present disclosure and with continued reference to FIG. 1, at step 110, the system generates a third response map based on the information gathered by the third camera. The third response map comprises information pertaining to the same structures as defined in the third region map. In another embodiment, the system compares the third region map with the third response map and calculates a confidence score.

In another exemplary embodiment of the present disclosure and with reference to FIG. 1, at step 120, the system generates a third corrected vehicle location based on the confidence score calculated by the third localizer. In an embodiment, the third corrected vehicle location is the same as the predicted location if the confidence score is 100%. In another embodiment, the system generates the third corrected location if the calculated confidence score is below a predetermined threshold. In such an embodiment, the system generates the third corrected location based on the vehicle's predicted location and a comparison of the third region map with the third response map.

In another exemplary embodiment of the present disclosure and with reference to FIG. 1, at step 130, the system updates the location of the vehicle. In an embodiment, the system uses the first, second, and third corrected locations to determine the most accurate position. In another embodiment, the system also utilizes the confidence scores of each corrected location to determine the most accurate vehicle position.

In another exemplary embodiment of the present disclosure and with reference to FIG. 1, at step 140, the system outputs on the updated location. In one embodiment, the system outputs the updated location to another system on the vehicle. For example, the system may output the updated location to a self-driving system piloting the vehicle. In another embodiment, the system outputs the updated location to an ADAS system. In another embodiment, the system outputs the updated location to the previous location, as described in FIG. 1, step 20.

Figure 2:
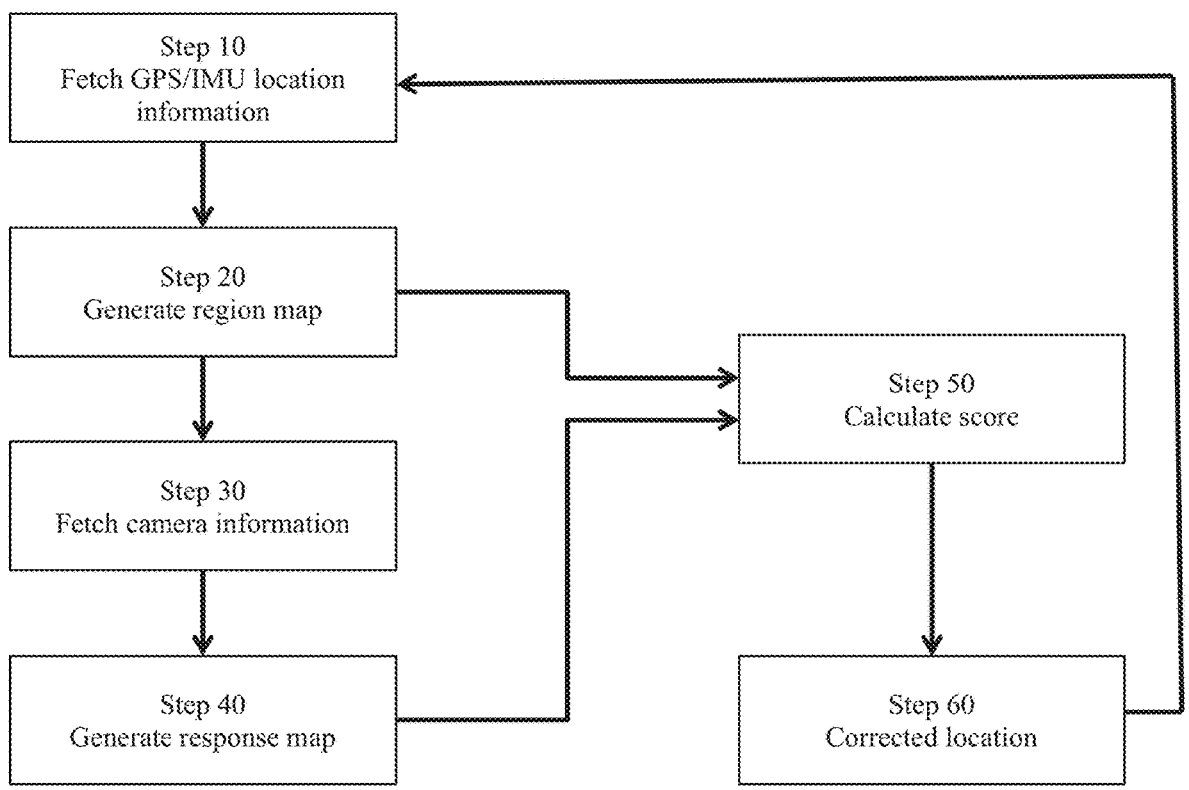
FIG. 2 illustrates a flowchart showing exemplary steps of localizing, according to an exemplary embodiment of the present disclosure.

FIG. 2 illustrates a method 200 for determining a vehicle's position within a lane, according to an exemplary embodiment of the disclosure. Further, the steps described in FIG. 2 may be undertaken by a system for lane marking localization and fusion as described in FIG. 1, at steps 50, 80, and 110. At step 210, a computer fetches GPS and/or IMU location information from an GPS device and/or an IMU device. The method described herein may further utilize the vehicle's previously determined location. At step 220, the computer generates a region map comprising previously-gathered information relating to the environment in which the vehicle is traveling. For example, the region map comprises information previously gathered by a collection vehicle using radar, LIDAR, GPS, and/or cameras. Such information pertained to the collection vehicle's location on a specific roadway relative to other roadways in the area, lane-specific information relative to the lane in which the collection vehicle is traveling, and information relating to the collection vehicle's speed, direction of travel, and/or velocity relative to the location information. In one embodiment, the computer generates the region map. In another embodiment, the computer receives the region map from a database.

At step 230, the system utilizes a camera installed on the vehicle. In one embodiment, the camera is installed on the vehicle having a predetermined viewing angle and orientation. For example, the camera is installed on the roof of the vehicle, centered on the vehicle's centerline, and pointing in the direction of travel, i.e., forward. The camera captures an image of the region in front of the vehicle. In another embodiment, the camera may capture video and/or photographic images at a predetermined frame rate. In another embodiment, the camera captures infrared and/or ultraviolet light. In one embodiment, the camera captures images at a predetermined rate. In another example, the camera captures images at a rate of at least 10 images per second.

At step 240, the system generates a response map based on information fetched from the camera. The response map may be generated in real-time or in near real-time. The response map may be generated on a predetermined interval, for example, 20 times per second. In one embodiment, the system uses an image fetched from the camera and identifies lane markers within the lanes of vehicle travel depicted in the image. The camera may identify other aspects of the roadway including, but not limited to, bridges, signs, barriers, street lights, and buildings. In one embodiment, the computer comprises computer-executable code configured to detect permanent and/or semi-permanent structures within a two-dimensional image. In such an embodiment, the computer analyzes the image captured from the camera and identifies lane indicators such as painted lines and reflectors. The computer may also identify other structures such as bridges, signs, barriers, street lights, and buildings. The computer may generate a response map on a predetermined interval. In one embodiment, the computer generates a response map at least ten times per second.

At step 250, the system generates the vehicle's predicted location and calculates a confidence score for determining the vehicle's lateral position within a lane. For example, the system determines the predicted location by comparing the region map against the response map. In such an embodiment, the system samples various points within the region map identifying lanes of vehicle travel. The system samples the response map and identifies lanes of travel depicted therein. The system then compares this sampled region map to the response map and generates the vehicle's predicted location based on the differences in the perspectives of the region and response maps. In such an embodiment, the system takes the GPS/IMU information, the region map, and the response map as arguments in calculating the vehicle's predicted location. For example, if the region map is substantially the same as the response map but skewed to the left, the system's comparison recognizes the vehicle's actual position must be to the right of the GPS location. The system generates a predicted vehicle location based those differences.

In another embodiment, at step 250, the system calculates a confidence score. Additionally, the system may generate the vehicle's predicted location. In one embodiment, for example, where the region map and the response map are identical, the system generates a confidence score of 1.000. In such an example, the environment data was gathered using a collection vehicle that was located at the same physical location with the same orientation of that of the system's vehicle. The confidence score reflects the system's confidence in the vehicle's predicted position compared to its position according to the region map, relative to the vehicle's lateral position within a lane. For example, a score of 1.000 correlates to a confidence of 100% and a score of 0.000 correlates to a confidence of 0%.

At step 260, the system outputs a predicted location. In one embodiment, the system may output the predicted location to an automated self-driving system. In another embodiment, the system may output the predicted location to an ADAS. In another embodiment, the system may output a corrected location if the confidence score is below a predetermined threshold. For example, the score threshold is set at 0.900. If the system generates a confidence score of anything less than 0.900, for example, a score of 0.85, the system generates a corrected location based on the comparison of the sampled region map and the response map. In an embodiment, the mathematical variance may be used as a confidence score. Further, if the system generates a confidence score of, for example, 0.950, the system outputs the vehicle's position as determined by the GPS/IMU information. In another embodiment, the system outputs the corrected location to an ADAS and/or an automated self-driving system. In another embodiment, the mathematical variance is used as the confidence score. Additionally, the system may reinput the vehicle's predicted location to be used in a subsequent iteration of the recited method, i.e., the result may be used in step 210.

Figure 3:
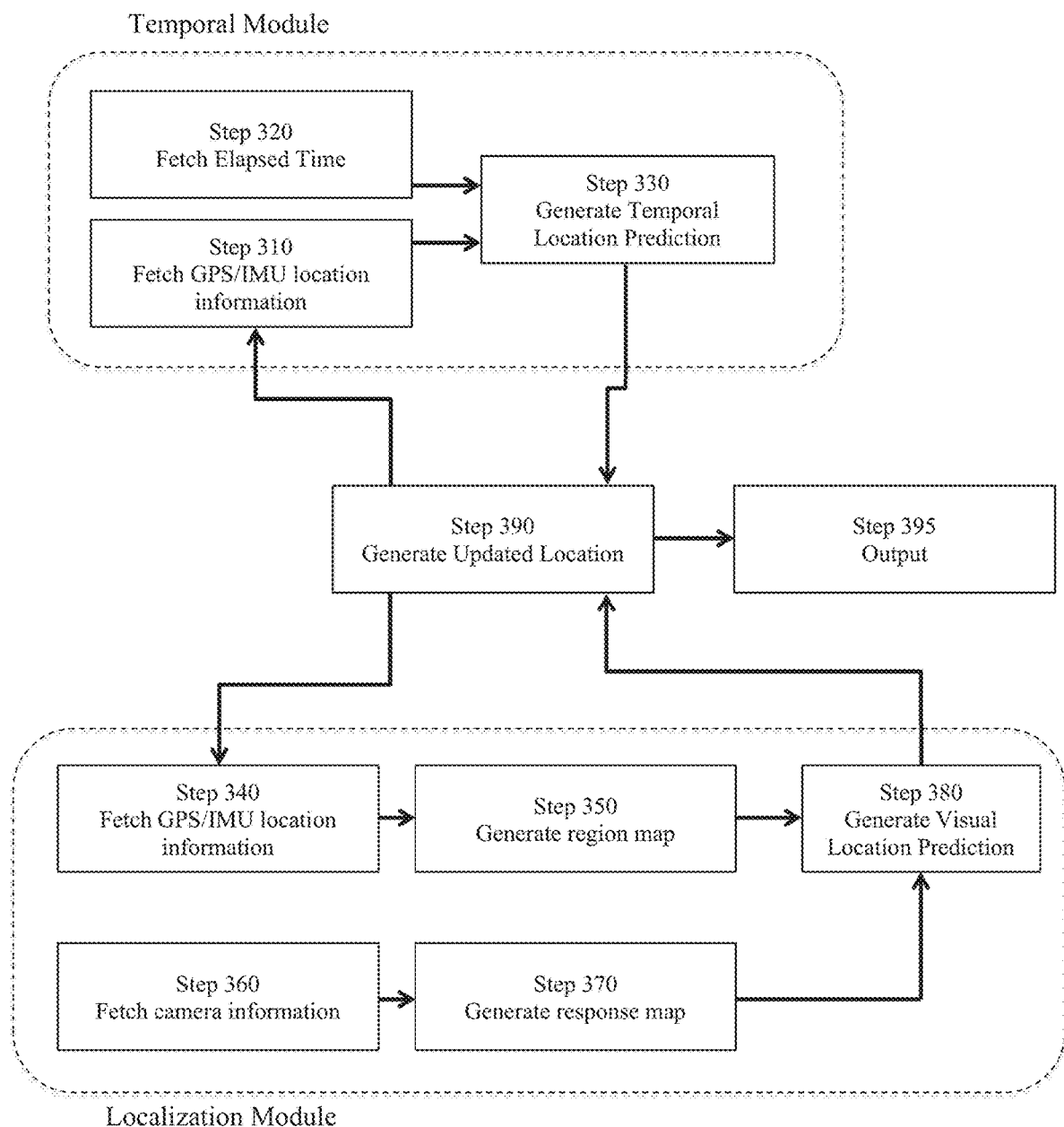
FIG. 3 illustrates a flowchart showing exemplary steps for fusing predicted locations, according to an exemplary embodiment of the present disclosure.

In another exemplary embodiment of the present disclosure and with reference to FIG. 3, the system and method for Lane Marking Localization and Fusion comprises a Temporal Module and a Localization Module to iteratively determine a vehicle's location.

The Temporal Module utilizes the vehicle's previously determined position, in combination with the vehicle's speed and direction to predict the vehicle's instantaneous location. The Localization Module utilizes visual information gathered from a plurality of cameras to predict the vehicle's location. The steps in the Localization Module, steps 340 through 380, are performed for each camera incorporated into the system. For example, in a system comprising three separate cameras, the present disclosure may comprise three separate Localization Modules performing the recited steps. Any number of cameras may be utilized without departing from the embodiments contemplated herein.

In the Temporal Module, at step 310, the vehicle's location is fetched from a GPS and/or an IMU device. At step 320, the elapsed time from between the vehicle's previous determined location and the instant determination is fetched. At step 330, the vehicle's instantaneous location is predicted. For example, if the vehicle had an average speed of 50 miles per hour (73.33 ft/sec) in a given direction and only 0.10 seconds have elapsed since the vehicle's position was last determined, the result of the Temporal Module, as performed in step 330, would be that the vehicle's instantaneous location is 7.333 ft further in the direction of travel, as compared to the vehicle's previous location.

In the Localization Module, at step 340, the vehicle's approximate location is fetched from a GPS and/or an IMU device. With the vehicle's GPS/IMU location, a region map is generated in step 350. At step 360, visual information is fetched from a camera and, in step 370, a response map in generated. At step 380, the Localization Module compares the region map against the response map to predict the vehicle's location. Additionally, at step 380, the system may generate a confidence score.

At step 390, the vehicle's instantaneous location is updated vis-à-vis the vehicle's location retrieved from a GPS and/or IMU device in steps 310 and/or 340. The system fuses the results of the Temporal Module, as obtained in step 330, and the results of the Localization Module, as obtained in step 380, to predict the vehicle's location. This prediction may then be used to predict the vehicle's location in the next iteration of the recited method, that is, used in steps 310 and 340. At step 395, the system may output the results of the vehicle's location obtained in step 390 to another system, such as an ADAS.

Figure 3A:
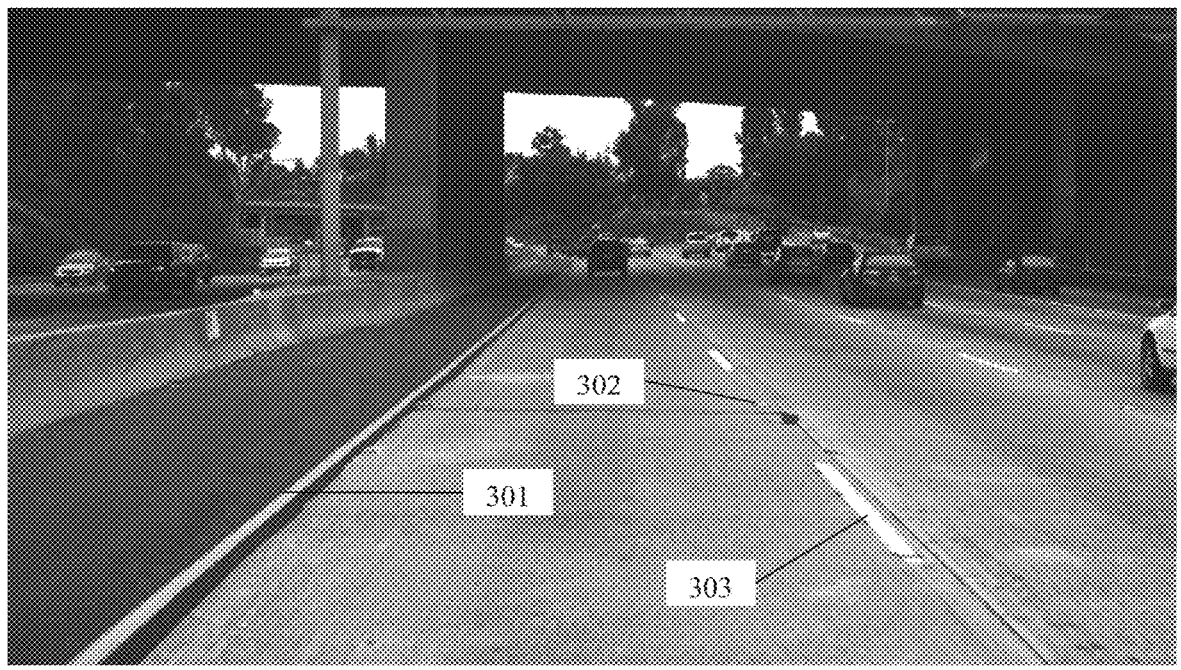
FIG. 3A illustrates an image taken from a vehicle's onboard camera, according to an exemplary embodiment of the present disclosure.

FIG. 3A illustrates an image taken by a single camera 120. Here, the camera 120 is facing the direction of travel. In other embodiments of the disclosure, the camera is positioned such that the view captured is not the direction of travel, e.g., facing behind the vehicle or to either side. In other embodiments of the disclosure, a plurality of cameras may be used. As disclosed herein, the camera may be installed anywhere on the vehicle having any orientation that allows the camera to view the vehicle's environment. When the camera is installed on the vehicle, the system may be updated as to the camera's positioning relative to the rest of the vehicle and the direction of travel. The system 100 analyzes the image taken by the camera and creates a response map by detecting lane markers such as solid lines 301, striped lines 303, and reflectors 302. In one embodiment, the camera may be permanently installed on the vehicle. For example, the camera may be integrated into the vehicle's rearview mirror or a bumper. In another embodiment, the camera may be temporarily installed on the vehicle. In another embodiment, the camera utilized may be included in a mobile device such as a cell phone or tablet. In such an embodiment, the mobile device may be temporarily installed on the vehicle and easily removed by a user.

Figure 3B:
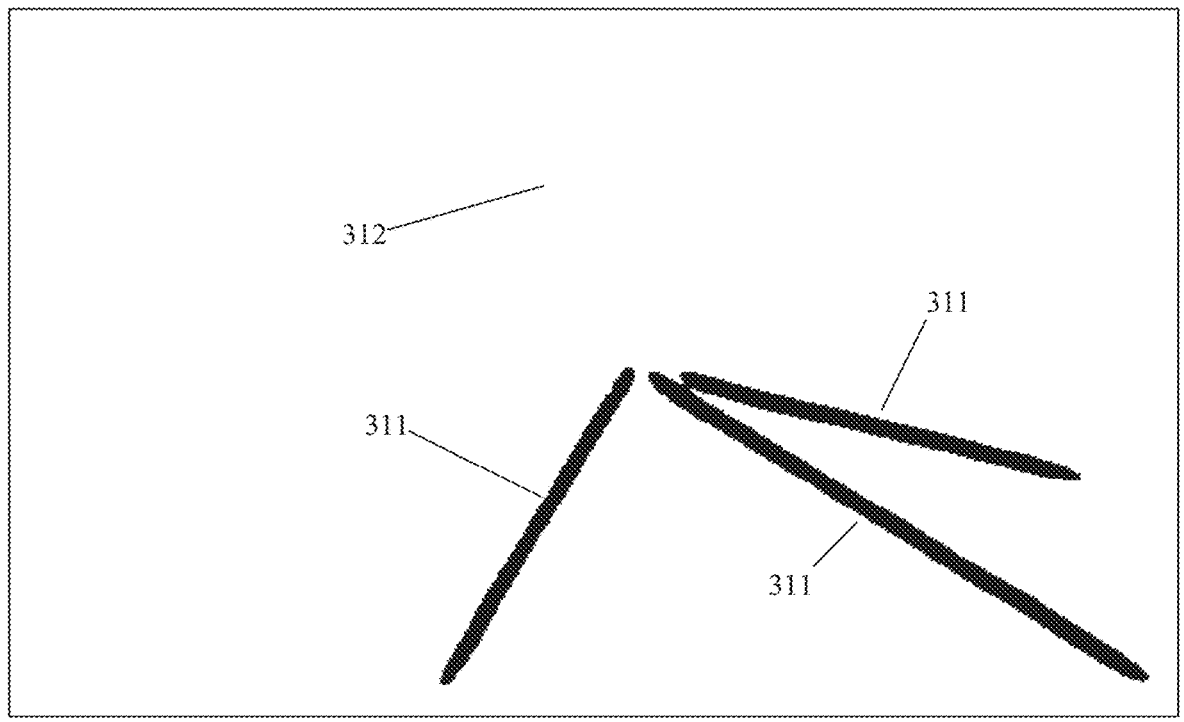
FIG. 3B illustrates a response map generated by the system, according to an exemplary embodiment of the present disclosure.

FIG. 3B illustrates an exemplary response map according to an embodiment of the disclosure. The response map reflects lane markings as recognized by the system. For example, the response map is a binary map indicating lane markings 311 shown as black lines. In such an embodiment, the system analyzes the location information for lane indicators. When the system identifies a lane indicator, it plots a point on the response map (depicted as a black dot against a white background). Everything other than the relevant lane markings 311 are shown as white space 312. The system plots a plurality of lane indicators on the response map, culminating as lane markers 311. The system may also use physical structures such as bridges, barriers, signs, and buildings to determine lane markings.

In one embodiment, the computer 160 comprises computer-executable, non-transient code configured to detect certain elements with an image. For example, the computer 160 recognizes lane markings within a roadway including painted solid lines 301, painted striped lines 303, and reflectors 302. The system generates the response map as a series points, culminating a lane marking lines 311. The response map represents the road ahead of the vehicle, viewed from the camera 150 and perceived by the computer 160. In other embodiments, the lane markings 311 reflect other structural components such as bridges, signs, and barriers (not shown).

Figure 3C:
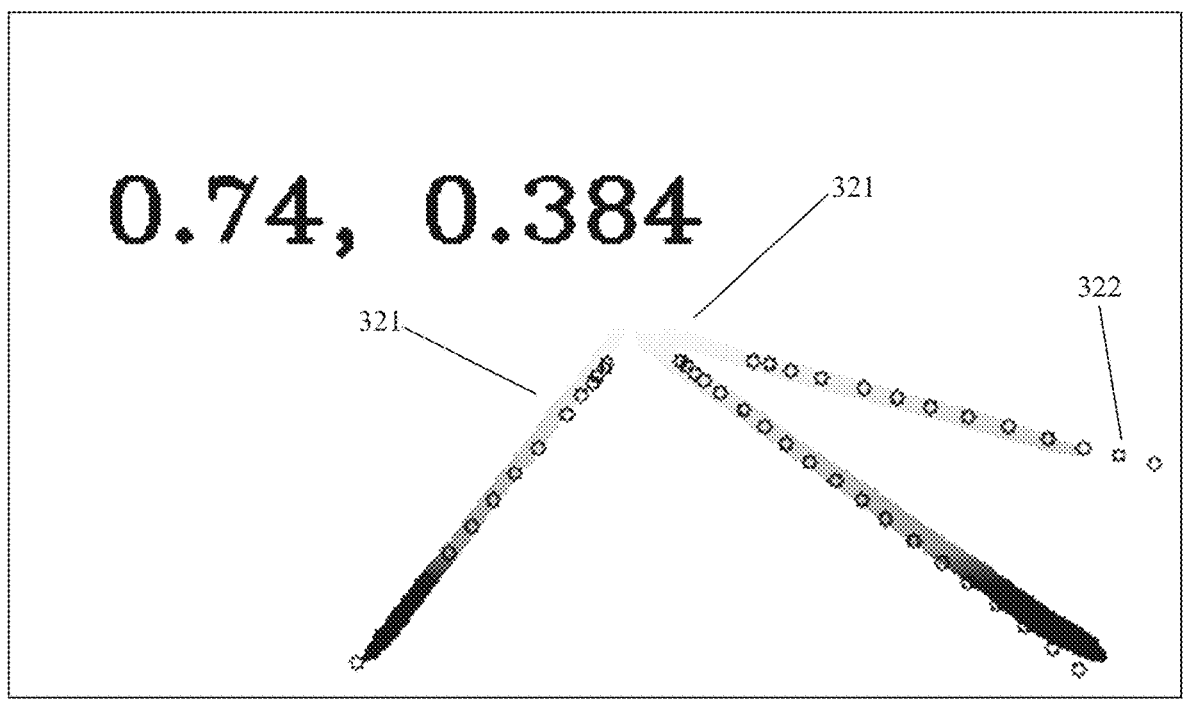
FIG. 3C illustrates a score calculation, according to an exemplary embodiment of the present disclosure.

FIG. 3C illustrates a lane map, according to an embodiment of the present disclosure. The lane map comprises a comparison of the region map against the response map. The region map is compiled using images, GPS, radar, and/or LIDAR information. The system plots plurality of region map points 322 (shown as circles). The region map points 322 reflect lane markings as detected in the environment data 130. The response map comprises a plurality lines 321 (shown as grey lines) indicating the lane markers as viewed from the camera and perceived by the computer. The computer analyzes the differences between the region map and the response map and generates the vehicle's predicted location.

Figure 4:
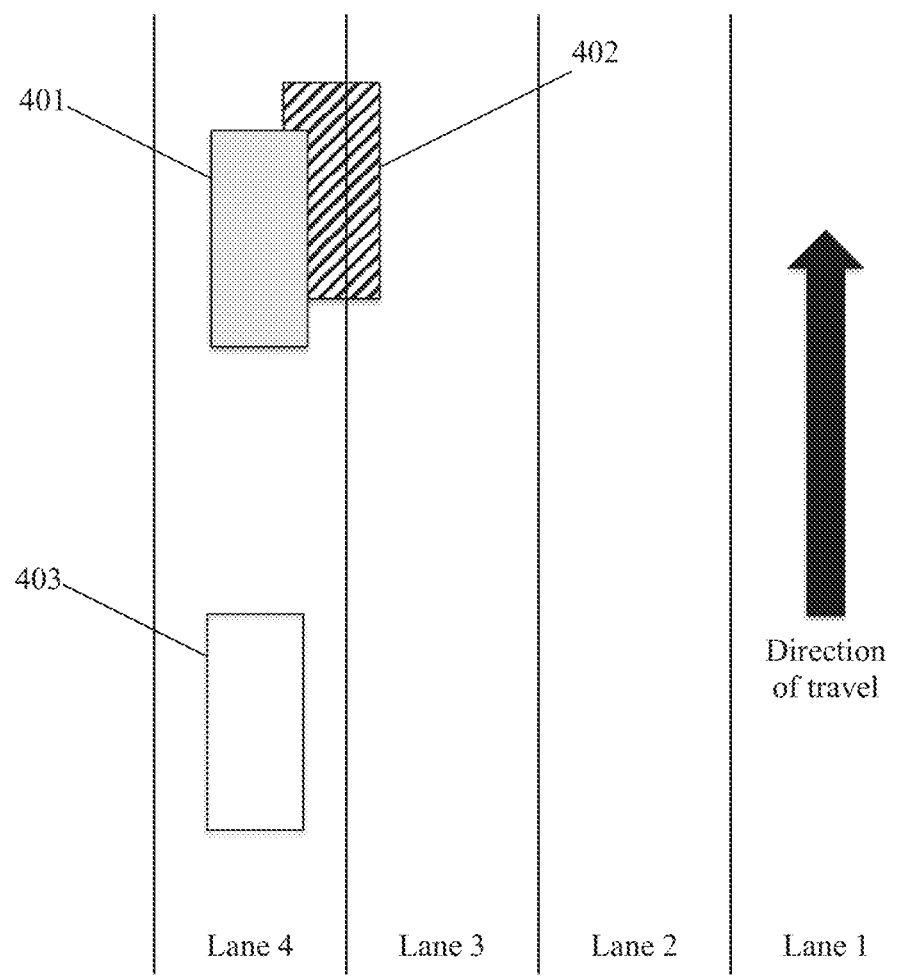
FIG. 4 illustrates a corrected position, according to an exemplary embodiment of the present disclosure.

In another embodiment, the system determines a confidence score based on the differences in the lane map, which is shown in the top-left corner. For example, a perfect match overlays with 100% accuracy, resulting in a score of 1.000 (not shown). In another example, the system may determine a score of 0.74 where the overlay is a 74% match (as shown). In such an embodiment, the overlay is close, but the region map points 322 differs from the points from the response map lines 321 at some, but not all of the region map points 322. In such an embodiment, the score threshold may be 0.90, and in such an instance, the system would output a predicted vehicle location by analyzing the differences in the lane map. In another embodiment, the system may also determine other statistical parameters, such as the variance. In such an embodiment, the variance is calculated, for example, of 0.384 (as shown). For example, a logistic function may be used to calculate the variance, such as:

$$\text{variance} = \frac{x_{min} + (x_{max} - x_{min})}{1 + e^{S(Gx-m)}}$$

where,
$x_{min}$=the minimum value
$x_{max}$=the maximum value
S=the steepness
G=the growth rate
x=the matching score of the response map
m=the midpoint FIG. 4 illustrates an updated vehicle location, according to an embodiment of the present disclosure. The predicted location 401 is determined using GPS and/or IMU locating information. Some embodiment may also consider the vehicle's previous location 403, as determined by a previous iteration of the techniques described herein. The GPS location 402 represents where the GPS perceives the vehicle to be relative to the lanes of travel. Notably, the GPS location 402 often varies greatly from the vehicle's actual location 403. Where the score is below a predetermined threshold, the system determines the predicted location 401 and outputs that location. In such an embodiment, the system recognizes which lane of traffic the vehicle is traveling. In other embodiments, the system determines the vehicle's predicted location 401 regardless of the confidence score. In other embodiments, the system may use the confidence score to determine the vehicle's predicted location 401. Although the vehicle's previous location 403 is depicted as being a single location, the techniques described herein may use any number of previously determined locations. For example, the system may utilize the 10 most recent determinations of the vehicle's previous location. Further, the system, in determining the vehicle's instantons location 401 may weight previous locations 403 differently, without departing from the embodiments contemplated herein.

Although a lane marking localization system has been shown and described, lane marking localization systems may be implemented according to other embodiments of the disclosure. For example, the system may utilize a plurality of cameras or other information gathering devices such as radar or LIDAR. Other embodiments of the disclosure may utilize a plurality of external or internal databases, on which relevant information is stored. Other embodiments also include those that output information to vehicle driving aids such as navigation and ADAS systems.

In an embodiment of the disclosure, the methodologies and techniques described herein are implemented on a special purpose computer programmed to determine lane marking and relative vehicle position. In an embodiment of the disclosure, the special-purpose computer comprises an embedded system with a dedicated processor equipped as part of a vehicle. In other embodiments, some or all of the components of the present disclosure may be integrated as part of a mobile device, for example, a cell phone or a tablet. The disclosure has been described herein using specific embodiments for the purposes of illustration only. It will be readily apparent to one of ordinary skill in the art, however, that the principles of the disclosure can be embodied in other ways. Therefore, the disclosure should not be regarded as being limited in scope to the specific embodiments disclosed herein, but instead as being fully commensurate in scope with the following claims.

What is claimed is:

1. A method for determining a location of a vehicle, comprising:
    receiving a first region map and a second region map from a database;
    receiving a first response image and a second response image generated by different imaging devices respectively, the first response image and the second response image comprising information relating to an environment of the vehicle;
    generating a first response map from the first response image, and a second response map from the second response image;
    generating a first location of the vehicle based on a comparison of the first response map and the first region map;
    generating a second location of the vehicle based on a comparison of the second response map and the second region map; and
    predicting the location of the vehicle based on the first location and the second location.

2. The method of claim 1, wherein at least one of the first region map or the second region map includes information from a previously generated vehicle location.

3. The method of claim 1, wherein the first response map includes information pertaining to a same structure as defined in the first region map and the second response map includes information pertaining to a same structure as defined in the second region map.

4. The method of claim 1, further comprising:
    identifying lanes of a travel of the vehicle in the first region map; and
    determining a lateral position of the vehicle within a lane.

5. The method of claim 1, further comprising:
generating a confidence score of the location of the vehicle; and
outputting the location of the vehicle to an advanced driver assistance system (ADAS) of the vehicle based the confidence score.

6. The method of claim 1, further comprising:
receiving a third region map from the database;
receiving a third response image generated by an imaging device, the third response image comprising information relating to the environment of the vehicle;
generating a third response map from the third response image; and
generating a third corrected location of the vehicle based on comparing the third response map to the third region map,
wherein the location of the vehicle is predicted based on the third corrected location.

7. The method of claim 6, wherein the first response image is generated by a first imaging device, the second response image is generated by a second imaging device, and the third response image is generated by a third imaging device, wherein the first imaging device, the second imaging device, and the third imaging device are each adapted to perceive different aspects of the environment of the vehicle.

8. A system of determining a location of a vehicle, comprising:
a data processor; and
a memory storing instructions executable by the data processor to:
receive a first region map and a second region map from a database;
receive a first response image and a second response image generated by different imaging devices respectively, the first response image and the second response image comprising information relating to an environment of the vehicle;
generate a first response map from the first response image, and a second response map from the second response image;
generate a first location of the vehicle based on a comparison of the first response map and the first region map;
generate a second location of the vehicle based on a comparison of the second response map to the second region map; and
predict the location of the vehicle based on the first location and the second location.

9. The system of claim 8, wherein at least one of the first region map or the second region map includes information from a previously generated vehicle location.

10. The system of claim 8, wherein the first response map includes information pertaining to a same structure as defined in the first region map and the second response map includes information pertaining to a same structure as defined in the second region map.

11. The system of claim 8, wherein the instructions further cause the data processor to:
identify lanes of a travel of the vehicle in the first region map; and
determine a lateral position of the vehicle within a lane.

12. The system of claim 8, wherein the instructions further cause the data processor to:
generate a confidence score of the location of the vehicle; and
output the location of the vehicle to an advanced driver assistance system (ADAS) of the vehicle based the confidence score.

13. The system of claim 8, wherein the instructions further cause the data processor to:
detect lane markers in the first response image, the lane markers pertaining to physical aspects contained in the first response image; and
plot a plurality of first response points on the first response map, the plurality of first response points indicating locations of the lane markers.

* * * * *